(12) United States Patent
Day et al.

(10) Patent No.: US 12,730,995 B2
(45) Date of Patent: Sep. 8, 2026

(54) ORBITAL OBJECT IDENTIFICATION SYSTEM AND METHOD

(71) Applicant: Nederlandse Organisatie voor toegepast-natuurwetenschappelijk onderzoek TNO, 's-Gravenhage (NL)

(72) Inventors: James Peter Robert Day, Berkel en Rodenrijs (NL); Fabrizio Silvestri, Delft (NL); Ivan Ferrario, Delft (NL); Jerome Caron, Leiden (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/855,372

(22) PCT Filed: Apr. 11, 2023

(86) PCT No.: PCT/NL2023/050186
§ 371 (c)(1),
(2) Date: Oct. 9, 2024

(87) PCT Pub. No.: WO2023/200336
PCT Pub. Date: Oct. 19, 2023

(65) Prior Publication Data

US 2025/0335729 A1 Oct. 30, 2025

(30) Foreign Application Priority Data

Apr. 12, 2022 (EP) .................................... 22167981

(51) Int. Cl.
*G06K 7/10* (2006.01)

(52) U.S. Cl.
CPC ................................ *G06K 7/10544* (2013.01)

(58) Field of Classification Search
CPC ........ G06K 7/10544; G06K 7/00; G06K 7/10; G06K 7/14
(Continued)

(56) References Cited

U.S. PATENT DOCUMENTS

2009/0224989 A1* 9/2009 Youn ...................... H01P 1/203
343/722
2017/0264022 A1* 9/2017 Mroczek ............... H01Q 15/14
(Continued)

FOREIGN PATENT DOCUMENTS

CN 110858799 A * 3/2020 ......... G06K 7/10366

OTHER PUBLICATIONS

European Patent Office, International Search Report in corresponding International Application No. PCT/NL2023/050186 dated Jul. 5, 2023.

*Primary Examiner* — Edwyn Labaze
(74) *Attorney, Agent, or Firm* — Leydig, Voit & Mayer, Ltd.

(57) ABSTRACT

A cooperative orbital object identification system is disclosed herein that comprises an identification station and at least one tagged orbital object, i.e. an orbital object with a retroreflecting identification tag mounted thereon. The retroreflecting identification tag comprises a spectral filter having a surface area partitioned into respective surface area portions having respective, mutually different spectral characteristics. In this way it is rendered possible to distinguish a tagged orbital object from a potentially large set of tagged orbital object in an efficient way that does not need an energy source in the orbital object.

22 Claims, 6 Drawing Sheets

(58) Field of Classification Search
USPC .......................................... 235/454, 439, 435
See application file for complete search history.

(56) References Cited

U.S. PATENT DOCUMENTS

| | | | | |
|---|---|---|---|---|
| 2017/0280211 | A1* | 9/2017 | Damaghi ........... | H04B 7/18517 |
| 2018/0239024 | A1* | 8/2018 | Brand ................ | H04B 7/18519 |
| 2020/0208988 | A1 | 7/2020 | Dixit et al. | |
| 2021/0325661 | A1 | 10/2021 | Filo | |
| 2024/0088957 | A1* | 3/2024 | Wang ................. | G06K 19/0723 |

* cited by examiner

| | r-> | | | | | | | |
|---|---|---|---|---|---|---|---|---|
| n | 1 | 2 | 3 | 4 | 5 | 6 | 7 | 8 |
| 1 | 1 | 1 | 1 | 1 | 1 | 1 | 1 | 1 |
| 2 | 1 | 2 | 3 | 5 | 7 | 11 | 13 | 19 |
| 3 | 1 | 3 | 6 | 13 | 22 | 40 | 55 | 88 |
| 4 | 1 | 4 | 10 | 26 | 51 | 103 | 161 | 277 |
| 5 | 1 | 5 | 15 | 45 | 100 | 221 | 386 | 711 |
| 6 | 1 | 6 | 21 | 71 | 176 | 422 | 813 | 1599 |
| 7 | 1 | 7 | 28 | 105 | 287 | 742 | 1561 | 3270 |
| 8 | 1 | 8 | 36 | 148 | 442 | 1226 | 2794 | 6218 |
| 9 | 1 | 9 | 45 | 201 | 651 | 1929 | 4731 | 11157 |
| 10 | 1 | 10 | 55 | 265 | 925 | 2917 | 7657 | 19087 |
| 11 | 1 | 11 | 66 | 341 | 1276 | 4268 | 11935 | 31372 |

FIG. 4

| 9 | 10 | 11 | 12 | 13 | 14 | 15 | 16 |
|---|---|---|---|---|---|---|---|
| 1 | 1 | 1 | 1 | 1 | 1 | 1 | 1 |
| 23 | 29 | 33 | 43 | 47 | 59 | 65 | 73 |
| 118 | 163 | 205 | 280 | 334 | 436 | 517 | 625 |
| 407 | 607 | 831 | 1191 | 1537 | 2093 | 2647 | 3391 |
| 1136 | 1816 | 2681 | 4041 | 5596 | 7971 | 10691 | 14411 |
| 2760 | 4706 | 7442 | 11804 | 17425 | 25987 | 36808 | 52010 |
| 6063 | 10984 | 18509 | 30878 | 48336 | 75461 | 112484 | 166209 |
| 12323 | 23643 | 42271 | 74087 | 122465 | 199977 | 312797 | 482437 |
| 23532 | 47677 | 90112 | 165685 | 288202 | 491683 | 804982 | 1293858 |
| 42682 | 91082 | 181413 | 349363 | 637628 | 1135038 | 1940743 | 3246035 |
| 74129 | 166221 | 347919 | 700624 | 1338323 | 2482382 | 4424135 | 7689617 |

FIG. 4, Cont'd

ORBITAL OBJECT IDENTIFICATION SYSTEM AND METHOD

CROSS-REFERENCE TO RELATED APPLICATIONS

This patent application is a U.S. National Phase of PCT International Application No. PCT/NL2023/050186, filed Apr. 11, 2023, which claims priority to European Application No. 22167981.4, filed Apr. 12, 2022, which are both expressly incorporated by reference in their entireties, including any references contained therein.

BACKGROUND

The present disclosure is directed to a cooperative orbital object identification system.

The present disclosure is further directed to a cooperative orbital object identification method.

The last decade has seen an explosive growth in the number of CubeSat launches into Low Earth Orbit. Typically, CubeSats are launched in batches by a single launch vehicle into very similar orbits with low spatial and temporal separation. As a result, it can take weeks or months to identify each new CubeSat. Indeed, a significant proportion of CubeSats may never be identified, often due to in-orbit failure. In all cases, at the end of their operation the satellites become debris, for which new international policies are planned to make satellite owners and operators responsible for their disposal.

Therefore an identification technique is required to simply and unambiguously identify individual satellites with similar orbital characteristics, not only at beginning-of-life but also at end-of-life when all other on-board systems may have failed. Such on-board identification is therefore also relevant for larger satellites at end-of-life. This will require the capability to uniquely identify the satellite, and therefore its owner, for accountability.

Hampf et al. propose a passive system of retroreflectors as an identification tag for satellites in "A path towards low-cost, high-accuracy orbital object monitoring", Proc. 8th European Conference on Space Debris (virtual), Darmstadt, Germany, 20-23 Apr. 2021, published by the ESA Space Debris Office Ed. T. Flohrer, S. Lemmens & F. Schmitz, (http://conference.sdo.esoc.esa.int, May 2021)

Hampf et al. suggest that, advanced retroreflectors may provide means to identify targets uniquely. With little effort, retroreflectors can be modified to reflect back a target signature using properties of the laser light such as wavelength or polarization.

The suggested solution is indeed promising, in that it is a passive system, so that at the side of the orbital object, such as a satellite, no energy source is required. Hence, a satellite, even at the end of its life, can still be identified. Also, a potentially almost infinite set of unique signature can be provided by varying optical properties of the retroreflector.

SUMMARY

It is an object of the present disclosure to provide an improved orbital object identification system that renders possible to provide tags with mutually different optical properties in an cost efficient manner.

In accordance therewith an improved orbital object identification system is provided as claimed in claim 1. The improved orbital object identification system comprises an identification station and at least one tagged orbital object. In the context of this description a tagged orbital object refers to an orbital object with a retroreflecting identification tag mounted thereon.

The identification station comprises an optical beam generator, transmission optics, receive optics, a demultiplexing unit, a detection unit and a signal processing unit The optical beam generator is configured to generate at least one beam of optical radiation with controllable spectral properties and the transmission optics transmit the at least one beam in the direction of the identification tag.

The receive optics receive a portion of the optical radiation that is filtered and reflected by the tag and the demultiplexing unit separates the received portion of the optical radiation into a plurality of respective spectral components.

The detection unit has respective photodetection components that issue respective detection signals indicative of respective magnitudes of the respective spectral components. Based on the detection signals the signal processing unit identifies the tagged orbital object.

The retroreflecting identification tag of the tagged orbital object comprises a spectral filter with a surface area partitioned into respective surface area portions having respective, mutually different spectral characteristics.

Identification tags comprised in the improved orbital object identification system as claimed herein comprise a spectral filter with a plurality of spatially distributed filter elements having mutually different spectral characteristics. The identification station cannot perceive the pattern formed by the plurality of spatially distributed filter elements as such. The beams reflected by each of the spatially distributed filter elements arrive at the side of the identification station as a single mixed beam of radiation and the identifications station detects the spectral properties of this mixed beam. However, due to the fact that the spectral filter is composed of a plurality of spatially distributed filter elements with mutually different spectral characteristics, the individual filter elements can be selected from a relatively small standard set. For example with a set of less than ten filter elements it is already possible to provide thousands of unique tags.

In an embodiment a spatial surface of the spectral filter is A, and a surface area has surface area portions with respective spectral characteristics.

In an embodiment the wherein the spectral filter of the tag comprises respective bandpass filters in respective surface area portions. Bandpass filters can be manufactured in a relatively simple manner. Each bandpass filter is designed to transmit only optical radiation in a narrow wavelength range and reflects optical radiation outside that wavelength range. Only optical radiation that is transmitted through the bandpass filter is retroreflected and ultimately reaches the identification station. Optical radiation that is simply reflected by the bandpass filter cannot reach the identification station except in the rare occasion when the beam from the identification station strikes the bandpass filter at normal incidence.

Alternatively, the spectral filter of the tag comprises respective notch filters in respective surface area portions. Notch filters reflect only optical radiation in a particular wavelength range and transmit optical radiation outside that wavelength range. Only optical radiation that is transmitted through the notch filter is retroreflected and ultimately reaches the identification station. Optical radiation that is simply reflected by the notch filter cannot reach the identification station except in the rare occasion when the beam from the identification station strikes the notch filter at normal incidence. Whereas manufacturing costs for notch filters are higher than those for bandpass filters their use allows a larger number of combinations Further embodiments are possible wherein the spectral filter comprises both bandpass filters and notch filters.

In an embodiment, surface area portions have a value k/K, wherein k and K are natural numbers and wherein k is in the range from 0 to K. Different elements j from a pallet set j=1, . . . , J are assigned a portion kj/K of the surface for each of the spectral characteristics available in the pallet set, wherein the values kj and K are integers and wherein sum kj=K. Accordingly, therewith the tag is characterized with a vector: (k1/K, k2/K, kJ/K). In this way surface area portions are quantized. Therewith measurement noise can be avoided. A large value of K renders possible a large set of mutually different tags, but may increase the effect of noise. This may be circumvented by performing repeated identifications steps. Alternatively the identity of the tag may be encoded by the filter in a redundant manner, so that identification errors can be detected and identified.

In an example of this embodiment of the orbital object identification system the surface area portions each have a value of at least 1/K for each spectral characteristic in the pallet set of spectral characteristics. Accordingly each spectral characteristic of the pallet is assigned at least one area unit 1/K. This renders it possible to distinguish the at least one tagged orbital object from other objects. Should it be the case that the identification station does not perceive a particular spectral characteristic of the pallet set, it is clear that the perceived object is not one of a collection using the pallet set.

In another example the orbital object identification system further comprises a retroreflecting calibration tag mounted on the at least one orbital object. The calibration tag comprises a spectral filter with a respective predetermined, non-zero surface area portion for each spectral characteristic in a pallet set of spectral characteristics. Even if the identification tag does not have assigned non-zero surface area portions to one or more spectral characteristics in the pallet set, the presence of the calibration tag enables the identification station to distinguish the at least one tagged orbital object from an orbital object that is not part of the collection. This allows a more fine grained partitioning of the surface area of the identification tag, i.e. a higher value for K, and therewith a larger set of mutually distinct tags can be provided.

In some embodiments, the identification tag is one of a plurality of identification tags mounted in a distributed manner on the at least one tagged orbital object. Therein the plurality of identification tags have the same partitioning of their surface area for the mutually different spectral characteristics. Therewith the tagged orbital object can be properly identified regardless its spatial orientation.

In some embodiments the demultiplexing unit of the identification station comprises a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components. The chain of optical demultiplexing elements provides for a spectral demultiplexing of the received optical radiation with a minimum of optical losses as spectral components as substantially no radiation is absorbed therein. Respective spectral components of the received beam are redirected to respective photodetection components. In examples of these embodiments the demultiplexing elements are dichroic filters. In some examples the demultiplexing unit further comprises in at least one spectral channel at least one band-pass filter. The at least one band-pass filter can be selected to reject optical radiation in spectral bands that are not used as a component in the pallet set and therewith contribute to a suppression of detection noise.

In some embodiments the identification system further comprises a tracking module configured to track a position and/or attitude of an orbital object. For example this is achieved in that the identification system is configured to estimate the distance of the orbital object with a time of flight measurement. Additionally or alternatively, this is achieved in an example wherein the identification system is configured to estimate attitude of the orbital object from the direction from which its tag reflects the optical radiation. In some examples the tracking module is configured to estimate the position in space from a perceived direction and the estimated distance.

The present disclosure further pertains to a method of identifying an orbital object, the method comprising:

- Mounting a retroreflecting identification tag on the orbital object;
- Generating at least one beam of optical radiation with controllable spectral properties;
- Transmitting the at least one beam of optical radiation in the direction of the identification tag;
- Receiving a portion of the optical radiation as a result of retroreflection and filtering by the tag;
- Separating the received optical radiation into a plurality of respective spectral components;
- Providing respective detection signals indicative for respective magnitudes of the respective components;
- Identifying the orbital object on the basis of the combination of respective detection signals, According to the improved method the retroreflecting identification tag is provided with a spectral filter that has a surface area partitioned into respective surface area portions having respective, mutually different spectral characteristics.

BRIEF DESCRIPTION OF THE DRAWINGS

FIG. 4 shows a table that indicates a number of mutually distinct tags as a function of a number of available mutually different spatial characteristics and a number indicative for a granularity with which the surface area of the tags is partitioned;

DETAILED DESCRIPTION OF EMBODIMENTS

Figure 1:
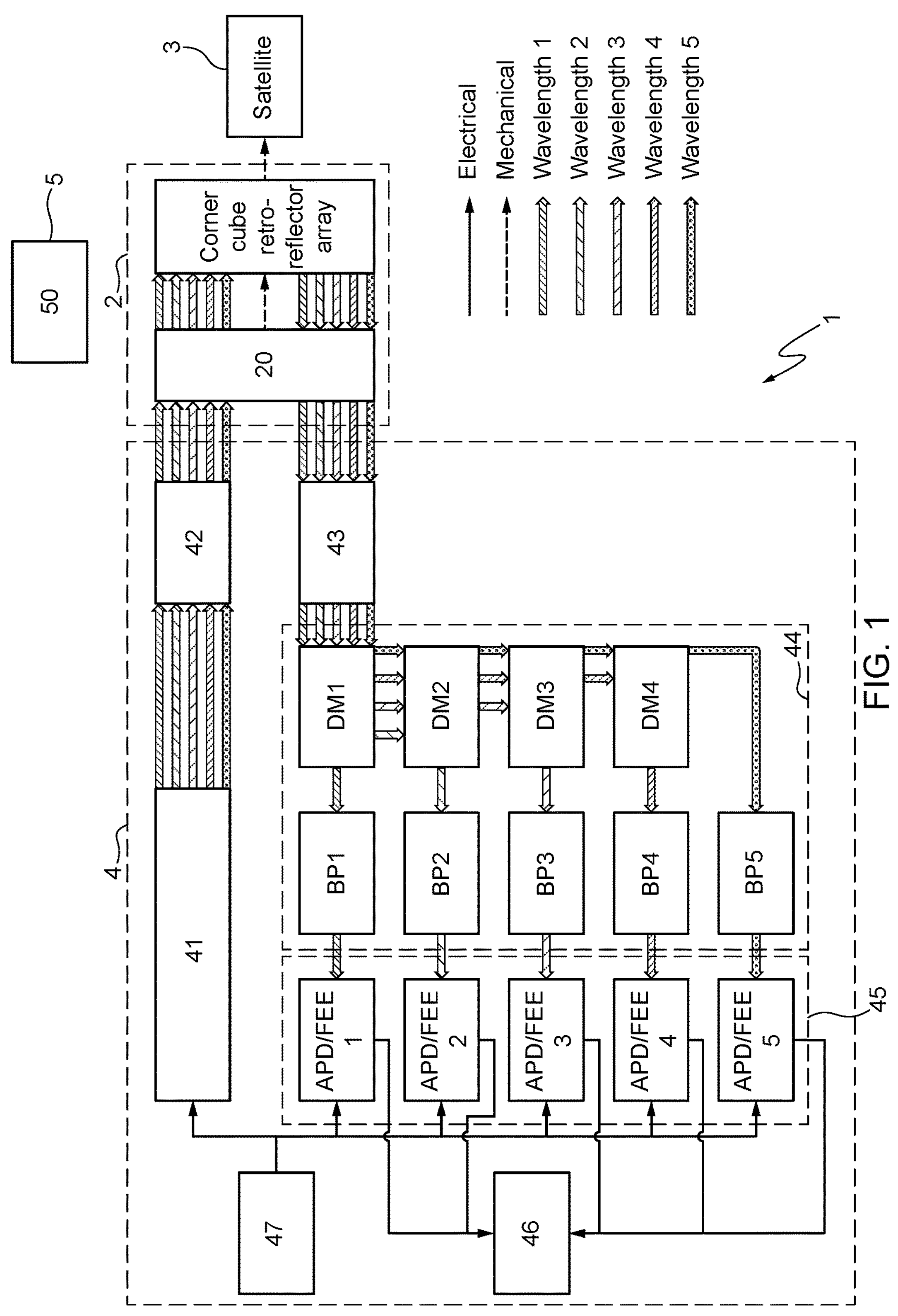
FIG. 1 schematically shows an embodiment of an improved orbital object identification system comprising an identification station and a tagged orbital object.

Like reference symbols in the various drawings indicate like elements unless otherwise indicated.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

In other instances, well known methods, procedures, and components have not been described in detail so as not to obscure aspects of the present invention.

FIG. 1 schematically shows an orbital object identification system 1 that comprises a retroreflecting identification tag 2 mounted on an orbital object 3, such as a satellite and an identification station 4.

The identification station 4 comprises an optical beam generator 41 that is configured to generate at least one beam of optical radiation with controllable spectral properties. In the context of this application, optical radiation is defined as radiation in the visible to near-infrared region of the electromagnetic spectrum, e.g. from about 400 nm to about 2500 nm. In one example, the optical beam generator 41 comprises a single optical beam source, e.g. a laser with a tunable wavelength and the identification system is configured to cause the optical beam source to generate the at least one beam with a time dependent central wavelength. In another example, the optical beam generator 41 comprises a suite of optical beam sources having mutually different fixed wavelengths. In that example the identification system is configured to selectively activate one or more of the optical beam sources. In a still further example the optical beam generator comprises one or more sources with a tunable wavelength and one or more sources with mutually different fixed wavelengths.

As shown further in FIG. 1, the identification station 4 comprises transmission optics 42 to transmit the at least one beam in the direction of the identification tag of the tagged orbital object 3 to be identified. Receive optics 43 are further provided to receive a portion of the optical radiation that is filtered and retroreflected by the tag. In the example of FIG. 1, the transmission optics 42 and the receive optics 43 are mutually separate modules. In alternative embodiments a single module is provided that both serves for transmission and receiving. In again other embodiments the transmission optics 42 and the receive optics 43 share one or more components but also have one or more respective proper components. Typically the transmission and receive optics include a controller to control a spatial direction in which the at least one beam is transmitted and to fine tune control of the spatial direction for optimizing receipt of the radiation from a tag of an orbital object that is currently being queried. As such a skilled person can readily provide a specific implementation. Accordingly, no further details are provided here in order not to obscure the description.

As shown in FIG. 1, the identification station comprises a demultiplexing unit 44 that is configured to separate the received portion of the optical radiation into a plurality of respective spectral components. In the example shown, the demultiplexing unit 44 has two stages. A first stage comprises the actual demultiplexing elements DM1, DM2, DM3, DM4, and a second stage comprises band-pass filters BP1, BP2, BP3, BP4 and BP5. Each of the demultiplexing elements, e.g. dichroic mirrors, selectively directs a respective spectral fraction to a respective one of the band path filters. The last demultiplexing elements DM4 directs one spectral fraction to the band-pass filter BP4 and the remaining spectral fraction to band-pass filter BP5. The other demultiplexing elements DM1, DM2, DM3 direct the remaining, non redirected spectral fraction to their respective successor DM2, DM3, DM4. The two-stage demultiplexing arrangement optimally splits the received optical radiation with a minimal optical loss. The band-pass filters BP1, BP2, BP3, BP4 and BP5 are provided reject spectral components that are not expected to be detected in the received optical radiation as they do not belong to spectral pallet that is used for the set of tagged orbital objects that are comprised in the system. Therewith the bandpass filter contribute to a reduction of noise that could originate from stray radiation and the like.

The identification station further comprises a detection unit 45 with respective photodetection components denoted as APD/FEE 1, 2, 3, 4, 5 that are provided to issue respective detection signals indicative of respective magnitudes of the respective spectral components transmitted by the band-pass filters BP1, BP2, BP3, BP4 and BP5. In the embodiment shown, the photodetection components each comprise an avalanche photodetector APD and a front end electronic unit. The front end electronic unit integrates photoelectrons acquired by each APD during a certain time period and generates a digital signal indicative for a value of the integration result. Whereas the present example is based on an analysis based on five spectral components, it will be appreciated that also embodiments are suitable based on a lower or higher number of spectral components.

As shown in FIG. 1, the identification station further comprises a signal processing unit 46 to identify the orbital object on the basis of the detection signals provided by the photodetection components APD/FEE 1, 2, 3, 4, 5.

Figure 2:
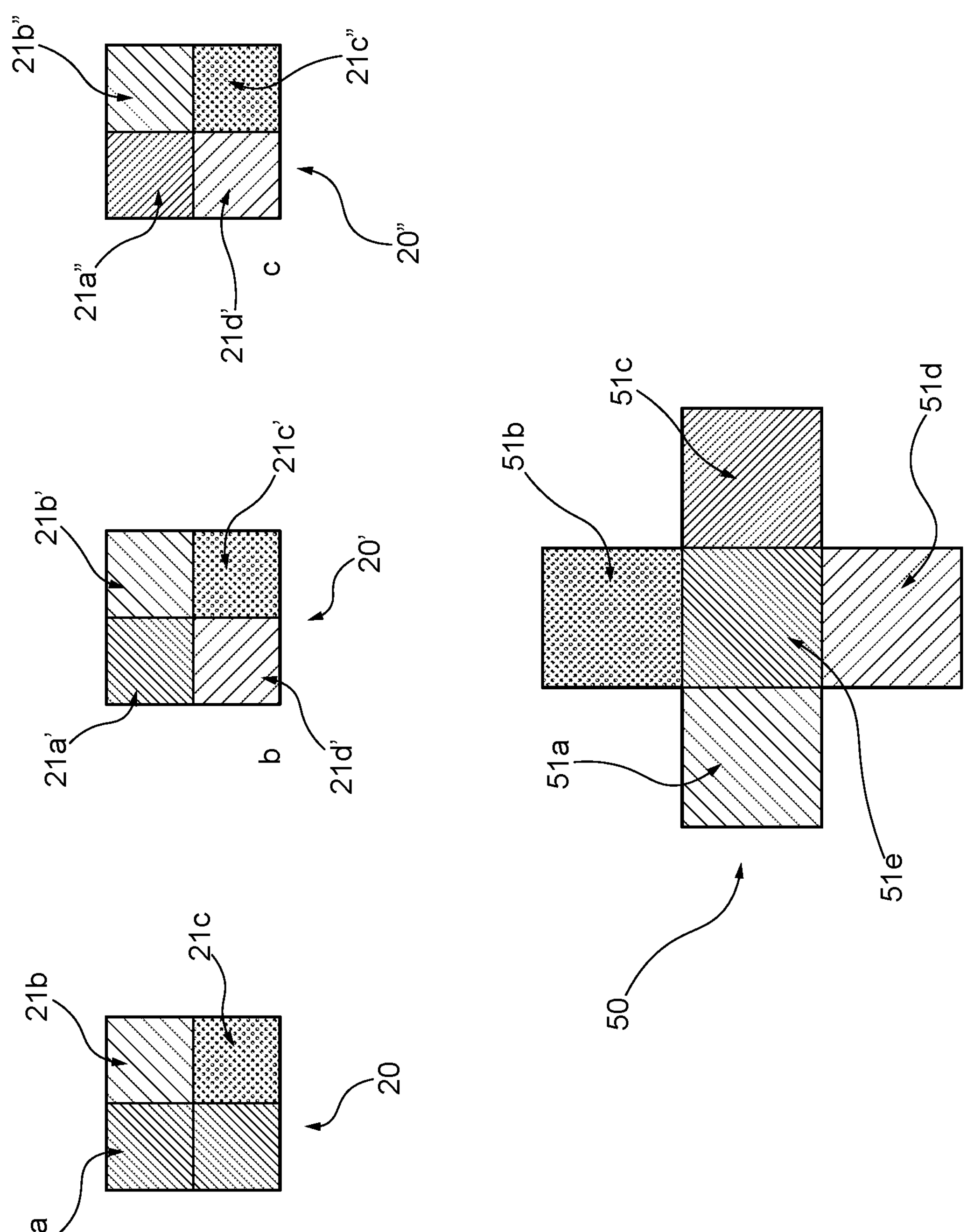
FIG. 2 shows exemplary tags suitable for use with a tagged orbital object in said embodiment.

As schematically shown in FIG. 1, the orbital object identification system 1 comprises a retroreflecting identification tag 2 mounted on an orbital object 3. In practice, the tag 2 is one of a plurality of tags mounted on respective orbital objects. As schematically shown in FIG. 2, the tags are mutually distinct in that each tag comprises a spectral filter 20, 20', 20" that has a surface area partitioned into respective surface area portions having respective, mutually different spectral characteristics. For example the spectral filter 20 has three surface area portions 21*a*, 21*b*, 21*c*, and each surface area portion has a proper spectral characteristics different from the other surface area portions.

In the example shown, the spectral characteristics are selected from a pallet of five spectral properties, symbolically referred to as Red (R), Orange (O), Yellow (Y), Green (G), Blue (B). The spectral characteristics of the filters can be specified as a vector indicating the respective surface area portions present for each of the spectral characteristics. For example the spectral filter 20 is characterized by the vector SC20=(0.25, 0, 0, 0.25, 0.5), the spectral filter 20' is characterized by the vector SC20'=(0.25, 0, 0.25, 0.25, 0.25) and the spectral filter 20" by the vector SC20"=(0.25, 0.25, 0.25, 0.25, 0).

The portion of the surface area assigned to each of the spectral characteristics in the pallet is quantized. Therewith measurement noise can be easily avoided. In a general case, different elements j from a pallet set j=1, . . . , J are assigned a portion kj/K of the surface for each of the spectral characteristics available in the pallet set, wherein the values kj and K are integers and wherein sum kj=K. Therewith the tag is characterized with (k1/K, k2/K, kJ/K)

A larger set of mutually different tags is made possible by increasing the number of available spectral characteristics in the pallet. Alternatively or additionally, this is possible by increasing the value of K or allowing also non-rational surface area partitions. This may increase the effect of noise. This disadvantage may be circumvented by performing repeated identifications steps. Alternatively or additionally, the identity of the tag may be encoded by the filter in a redundant manner, so that identification errors can be detected and possibly optionally corrected.

Therewith, it should be taken into account that tags having the filter elements in mutually different geometrical arrangements but having the same distribution of surface area cannot be distinguished.

In some embodiments the orbital object identification system 1 further comprises a retroreflecting calibration tag 5 mounted on the (at least one) orbital object 3. As shown schematically in the lower part of FIG. 2, the calibration tag 5 comprises a spectral filter 50 with a respective predetermined, non-zero surface area portion 51*a*, 51*b*, 51*c*, 51*d*, 51*e* for each spectral characteristic in the pallet set of spectral characteristics. In the example shown, the spectral filter of the calibration tag is characterized by the vector SC50=(0.2, 0.2, 0.2, 0.2, 0.2).

Figure 3:
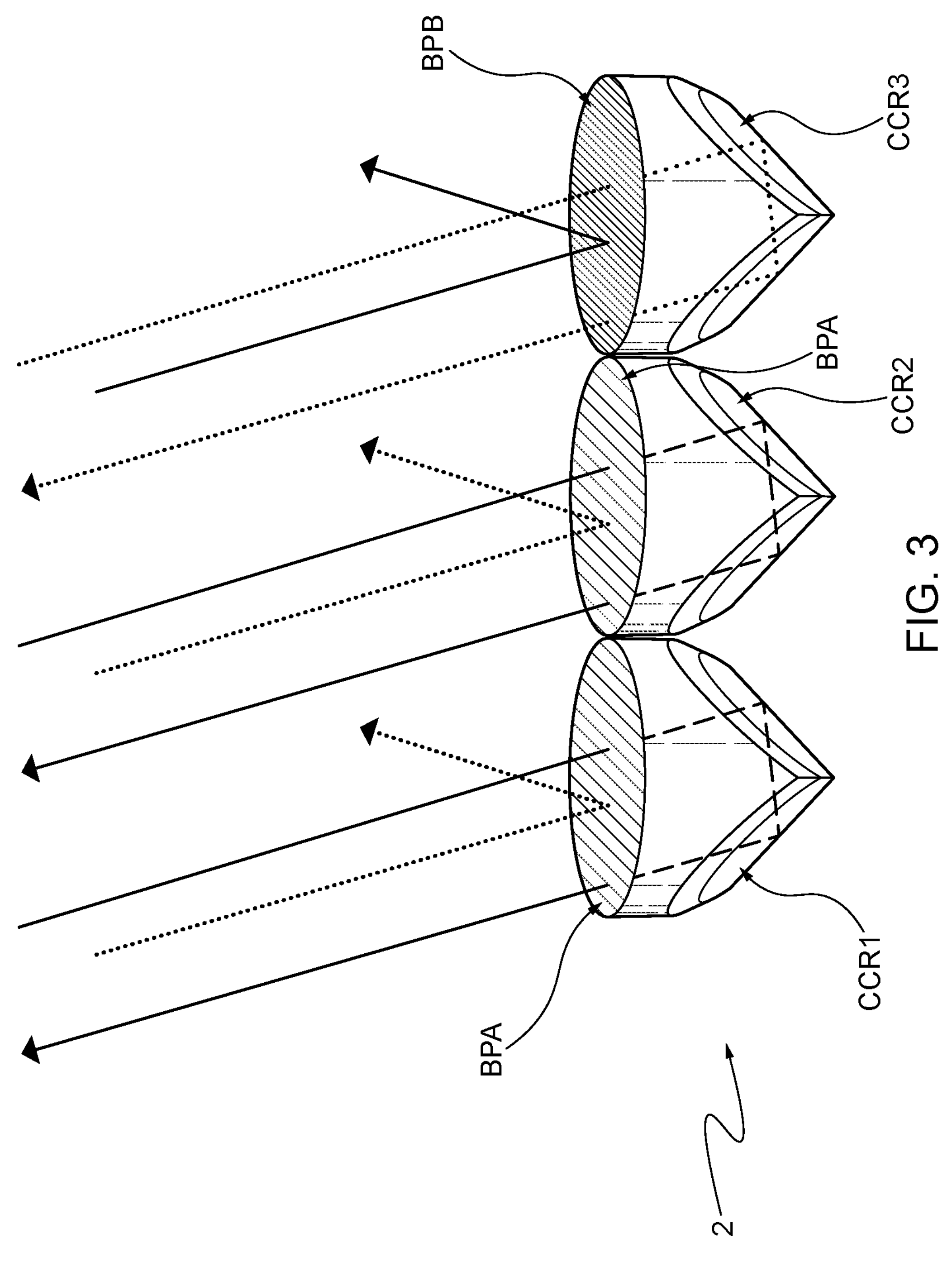
FIG. 3 shows another example of a tag suitable for use with a tagged orbital object in said embodiment.

FIG. 3 shows an embodiment of a tag 2 having two retroreflecting elements CCR1, CCR2 with a bandpass filter of a first type BPA and a further retroreflecting element CCR3 with a bandpass filter of a second type BPB. Presuming that the bandpass filters are selected from a pallet of three types, then this exemplary tag is characterized by the vector (⅔, ⅓, 0), i.e. approximately (0.667, 0.333, 0).

FIG. 4 shows a table indicating the number of mutually distinguishable tags that can be realized where "n" is the number of available spectral characteristics in the pallet and "r" is the number of filter positions +1. For example in the case of FIG. 2 the tags have four different filter positions. Therewith the value of r is equal to 5. Also it is presumed that the value for n is equal to 5. In that case, it can be seen in the table that the number of mutually different tags possible is equal to 100. The number of mutually different tags that can be achieved can be substantially higher if desired, by increasing the number of available spectral characteristics in the pallet and/or the number of filter positions.

Alternatively a system with a smaller set of mutually distinguishable tags may be provided as illustrated for example in FIG. 3. In that example n=3 and r=4. Therewith 13 different tags are possible.

Figure 5:
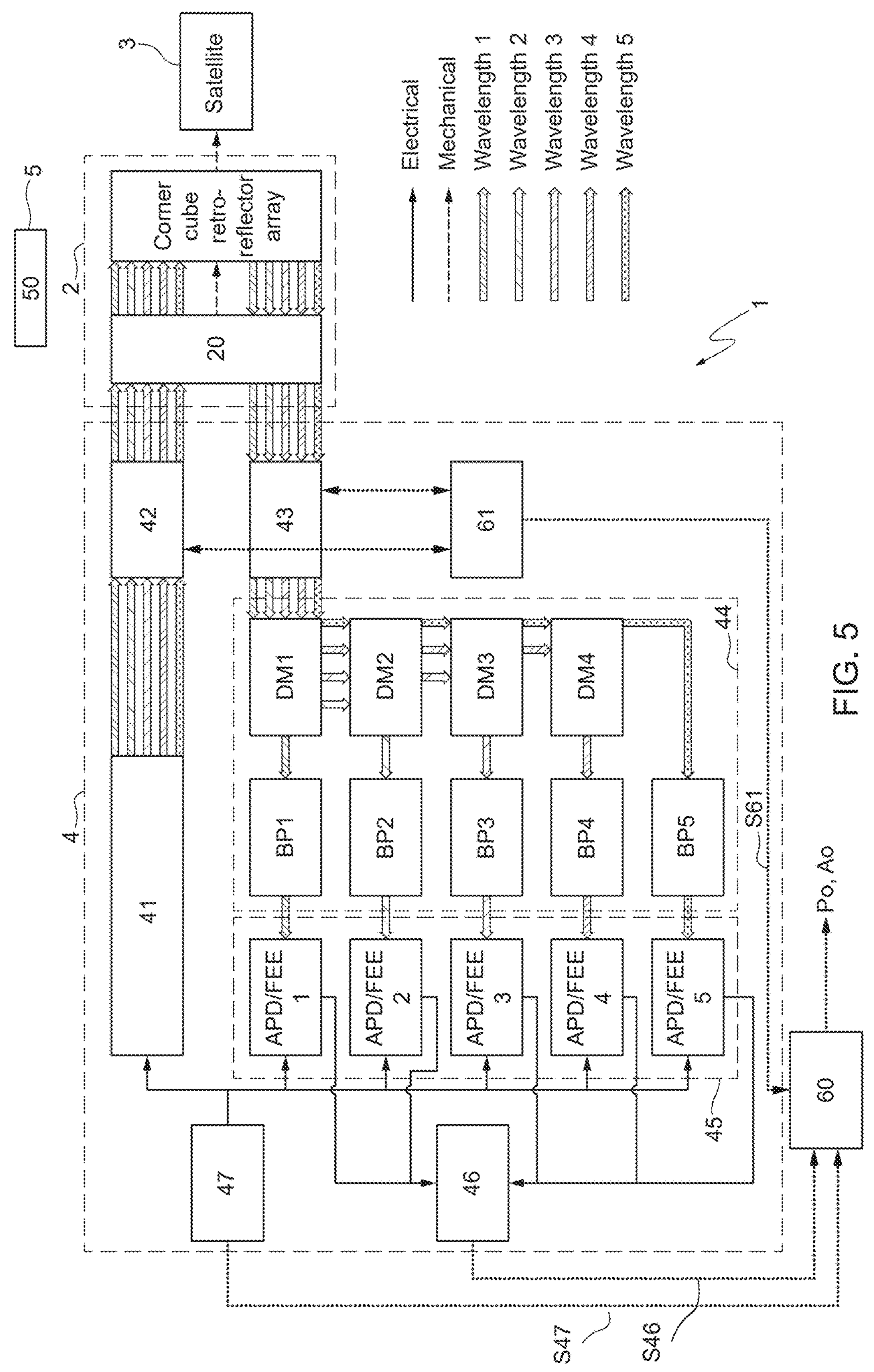
FIG. 5 shows an alternative embodiment of the improved orbital object identification system.

FIG. 5 shows an alternative embodiment of the identification system 1 that further comprises a tracking module 60 configured to track a position Po and/or attitude Ao of an orbital object. In the example shown, this is achieved in that the identification system is configured to estimate the distance of the orbital object with a time of flight measurement. For that purpose, the tracking module receives a first input signal S47 from the laser controller 47 that indicates a point in time at which a laser pulse is transmitted and a second input signal S46 from the signal processor 46 indicative for the point in time the reflection is received. Therewith the tracking module 60 can compute the distance of the orbital object. In the example shown, the tracking module 60 also receives a third input signal S61 from a beam direction controller 61. Therewith the tracking module 60 can determine an angular position of the orbital object. With this combination of information the tracking module 60 can determine the cartesian coordinates of the position of the orbital object.

While the present invention has been described with respect to a limited number of embodiments, those skilled in the art will appreciate numerous modifications and variations therefrom within the scope of this present invention as determined by the appended claims.

The invention claimed is:

1. An orbital object identification system comprising:

an identification station; and at least one tagged orbital object having a retroreflecting identification tag mounted thereon, wherein the identification station comprises:

an optical beam generator configured to generate at least one beam of optical radiation with controllable spectral properties;

transmission optics configured to transmit the at least one beam in the direction of the identification tag;

receive optics configured to receive a portion of the optical radiation that is filtered and reflected by the tag;

a demultiplexing unit configured to separate the received portion of the optical radiation into a plurality of respective spectral components;

a detection unit configured with respective photodetection components to issue respective detection signals indicative of respective magnitudes of the respective spectral components; and a signal processing unit configured to identify the orbital object on the basis of the detection signals, wherein the retroreflecting identification tag comprises a spectral filter having a surface area partitioned into respective surface area portions having respective, mutually different spectral characteristics, and wherein each surface area portion has a surface area that is a value k/K times a combined surface area of the surface area portions, wherein k and K are natural numbers, and wherein k is in the range from 0 to K.

2. The identification system according to claim 1, wherein the spectral filter of the retroreflecting identification tag comprises respective bandpass filters in respective surface area portions.

3. The identification system according to claim 2, wherein the spectral filter of the retroreflecting identification tag further comprises respective notch filters in respective surface area portions.

4. The orbital object identification system according to claim 3, wherein the retroreflecting identification tag is one of a plurality of retroreflecting identification tags mounted in a distributed manner on the at least one tagged orbital object, wherein the plurality of retroreflecting identification tags have same partitioning of their surface area for the mutually different spectral characteristics.

5. The orbital object identification system according to claim 2, wherein each surface area portion has a surface area that is a value k/K times a combined surface area of the surface area portions, wherein k and K are natural numbers, and wherein k is in the range from 0 to K.

6. The orbital object identification system according to claim 2, wherein the retroreflecting identification tag is one of a plurality of retroreflecting identification tags mounted in a distributed manner on the at least one tagged orbital object, wherein the plurality of retroreflecting identification tags have same partitioning of their surface area for the mutually different spectral characteristics.

7. The orbital object identification system according to claim 2, wherein the demultiplexing unit comprises a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components.

8. The identification system according to claim 1, wherein the spectral filter of the retroreflecting identification tag comprises respective notch filters in respective surface area portions.

9. The orbital object identification system according to claim 8, wherein the retroreflecting identification tag is one of a plurality of retroreflecting identification tags mounted in a distributed manner on the at least one tagged orbital object, wherein the plurality of retroreflecting identification tags have same partitioning of their surface area for the mutually different spectral characteristics.

10. The orbital object identification system according to claim 8, wherein the demultiplexing unit comprises a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components.

11. The orbital object identification system according to claim 1, wherein each spectral characteristic in a pallet set of spectral characteristics is assigned at least a surface area portion that has a surface area that is at least 1/K times the combined surface area.

12. The orbital object identification system according to claim 11, wherein the demultiplexing unit comprises a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components.

13. The orbital object identification system according to claim 1, further comprising a retroreflecting calibration tag mounted on the at least one orbital object, wherein the retroreflecting calibration tag comprises a spectral filter with a respective predetermined, non-zero surface area portion for each spectral characteristic in a pallet set of spectral characteristics.

14. The orbital object identification system according to claim 1, wherein the retroreflecting identification tag is one of a plurality of retroreflecting identification tags mounted in a distributed manner on the at least one tagged orbital object, wherein the plurality of retroreflecting identification tags have same partitioning of their surface area for the mutually different spectral characteristics.

15. The orbital object identification system according to claim 1, wherein the demultiplexing unit comprises a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components.

16. The orbital object identification system according to claim 15, wherein the demultiplexing unit further comprises, in at least one spectral channel, at least one band-pass filter.

17. The identification system according to claim 1, wherein the identification station further comprises a tracking module configured to track a position and/or attitude of an orbital object.

18. A method of identifying an orbital object comprising:

providing a retroreflecting identification tag including a spectral filter having a surface area partitioned into respective surface area portions having respective, mutually different spectral characteristics, wherein each surface area portion has a surface area that is a value k/K times a combined surface area of the surface area portions, wherein k and K are natural numbers, and wherein k is in the range from 0 to K, and wherein the retroreflecting identification tag is mounted on the orbital object;

generating at least one beam of optical radiation with controllable spectral properties;

transmitting the at least one beam of optical radiation in the direction of the identification tag;

receiving a portion of the optical radiation as a result of retroreflection and filtering by the tag;

separating the received optical radiation into a plurality of respective spectral components;

providing respective detection signals indicative for respective magnitudes of the respective components; and identifying the orbital object on the basis of the combination of respective detection signals.

19. An orbital object identification system comprising:

an identification station; and at least one tagged orbital object having a retroreflecting identification tag mounted thereon, wherein the identification station comprises:

an optical beam generator configured to generate at least one beam of optical radiation with controllable spectral properties;

transmission optics configured to transmit the at least one beam in the direction of the identification tag;

receive optics configured to receive a portion of the optical radiation that is filtered and reflected by the tag;

a demultiplexing unit configured to separate the received portion of the optical radiation into a plurality of respective spectral components;

a detection unit configured with respective photodetection components to issue respective detection signals indicative of respective magnitudes of the respective spectral components; and a signal processing unit configured to identify the orbital object on the basis of the detection signals, wherein the retroreflecting identification tag comprises a spectral filter having a surface area partitioned into respective surface area portions having respective, mutually different spectral characteristics, and wherein the retroreflecting identification tag is one of a plurality of retroreflecting identification tags mounted in a distributed manner on the at least one tagged orbital object, wherein the plurality of retroreflecting identification tags have same partitioning of their surface area for the mutually different spectral characteristics.

20. A method of identifying an orbital object comprising:

providing a retroreflecting identification tag including a spectral filter having a surface area partitioned into respective surface area portions having respective, mutually different spectral characteristics, wherein the retroreflecting identification tag is one of a plurality of retroreflecting identification tags mounted in a distributed manner on the at least one tagged orbital object, wherein the plurality of retroreflecting identification tags have same partitioning of their surface area for the mutually different spectral characteristics, and wherein the retroreflecting identification tag is mounted on the orbital object;

generating at least one beam of optical radiation with controllable spectral properties;

transmitting the at least one beam of optical radiation in the direction of the identification tag;

receiving a portion of the optical radiation as a result of retroreflection and filtering by the tag;

separating the received optical radiation into a plurality of respective spectral components;

providing respective detection signals indicative for respective magnitudes of the respective components; and identifying the orbital object on the basis of the combination of respective detection signals.

21. An orbital object identification system comprising:

an identification station; and at least one tagged orbital object having a retroreflecting identification tag mounted thereon, wherein the identification station comprises:

an optical beam generator configured to generate at least one beam of optical radiation with controllable spectral properties;

transmission optics configured to transmit the at least one beam in the direction of the identification tag;

receive optics configured to receive a portion of the optical radiation that is filtered and reflected by the tag;

a demultiplexing unit configured to separate the received portion of the optical radiation into a plurality of respective spectral components;

a detection unit configured with respective photodetection components to issue respective detection signals indicative of respective magnitudes of the respective spectral components; and a signal processing unit configured to identify the orbital object on the basis of the detection signals, wherein the retroreflecting identification tag comprises a spectral filter having a surface area partitioned into respective surface area portions having respective, mutually different spectral characteristics, and wherein the demultiplexing unit comprises a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components.

22. A method of identifying an orbital object comprising:

providing a retroreflecting identification tag including a spectral filter having a surface area partitioned into respective surface area portions having respective, mutually different spectral characteristics, wherein the retroreflecting identification tag is mounted on the orbital object;

generating at least one beam of optical radiation with controllable spectral properties;

transmitting the at least one beam of optical radiation in the direction of the identification tag;

receiving a portion of the optical radiation as a result of retroreflection and filtering by the tag;

separating the received optical radiation into a plurality of respective spectral components, using a demultiplexing unit comprising a chain of optical demultiplexing elements that are each configured to selectively redirect a respective spectral fraction of incoming optical radiation and to transmit a remaining spectral fraction of the incoming optical radiation so as to separate the received portion of the optical radiation into respective optical channels for the respective photodetection components;

providing respective detection signals indicative for respective magnitudes of the respective components; and identifying the orbital object on the basis of the combination of respective detection signals.

* * * * *